(12) United States Patent
Jitaru

(10) Patent No.: US 7,764,518 B2
(45) Date of Patent: Jul. 27, 2010

(54) HIGH EFFICIENCY FLYBACK CONVERTER

(75) Inventor: Ionel D. Jitaru, Tucson, AZ (US)

(73) Assignee: DET International Holding Limited, Grand Cayman (KY)

( * ) Notice: Subject to any disclaimer, the term of this patent is extended or adjusted under 35 U.S.C. 154(b) by 935 days.

(21) Appl. No.: 10/511,232

(22) PCT Filed: Apr. 11, 2003

(86) PCT No.: PCT/CH03/00245

§ 371 (c)(1),
(2), (4) Date: Aug. 4, 2005

(87) PCT Pub. No.: WO03/088465

PCT Pub. Date: Oct. 23, 2003

(65) Prior Publication Data

US 2006/0013022 A1    Jan. 19, 2006

Related U.S. Application Data

(60) Provisional application No. 60/372,280, filed on Apr. 12, 2002.

(51) Int. Cl.
H02M 3/335 (2006.01)
H02M 7/04 (2006.01)

(52) U.S. Cl. .............. 363/21.12; 363/21.14; 363/21.16; 363/89

(58) Field of Classification Search .............. 363/21.12, 363/21.14, 21.16, 89
See application file for complete search history.

(56) References Cited

U.S. PATENT DOCUMENTS 5,907,481 A * 5/1999 Svardsjo ..................... 363/25
6,026,005 A * 2/2000 Abdoulin ..................... 363/89

(Continued)

FOREIGN PATENT DOCUMENTS

EP    1 134 756    9/2001

*Primary Examiner*—Bao Q Vu
(74) *Attorney, Agent, or Firm*—Venable LLP; Robert S. Babayi (57) ABSTRACT

A DC-DC flyback converter that has a controlled synchronous rectifier in its secondary circuit, which is connected to the secondary winding of a main transformer. A main switch (typically a MOSFET) in the primary circuit of the converter is controlled by a first control signal that switches ON and OFF current to the primary winding of the main transformer. To prevent cross-conduction of the main switch and the synchronous rectifier, the synchronous rectifier is turned ON in dependence upon a signal derived from a secondary winding of the main transformer and is turned OFF in dependence up a signal derived from the first control signal. In one embodiment the first control signal is inverted and delivered to a logic circuit along with the voltage across the main transformer secondary winding and the voltage across the synchronous rectifier. In a further embodiment the first control signal is differentiated and supplied to a control primary winding wound on the outer flux paths of a main transformer core that has a center flux path on which is wound the main transformer primary and secondary windings. A control secondary winding is wound on the outer flux paths in current canceling relation as to flux conducted from the center flux path into the outer flux paths. The control signal for the synchronous rectifier is taken from the output of the control secondary winding in this latter embodiment.

10 Claims, 8 Drawing Sheets

U.S. PATENT DOCUMENTS

| | | | |
|---|---|---|---|
| 6,049,471 A * | 4/2000 | Korcharz et al. | 363/20 |
| 6,198,638 B1 | 3/2001 | Lee | |
| 6,246,593 B1 * | 6/2001 | Cheng | 363/17 |
| 6,351,396 B1 | 2/2002 | Jacobs | |
| 6,400,579 B2 * | 6/2002 | Cuk | 363/16 |
| 6,418,039 B2 * | 7/2002 | Lentini et al. | 363/21.06 |
| 6,714,428 B2 * | 3/2004 | Huang et al. | 363/89 |
| 6,822,427 B2 * | 11/2004 | Wittenbreder | 323/282 |
| 2003/0205990 A1 * | 11/2003 | Wittenbreder, Jr. | 323/222 |

* cited by examiner

HIGH EFFICIENCY FLYBACK CONVERTER

CROSS REFERENCE TO RELATED APPLICATIONS

This is the U.S. national stage of Patent Cooperation Treaty (PCT) application No. PCT/CH03/00245 from which priority is claimed, and which claims priority from U.S. provisional patent application Ser. No. 60/372,280 entitled "High Efficiency Flyback Converter" filed Apr. 12, 2002 in the name of Ionel D. Jitaru. That application is incorporated herein by reference.

FIELD OF THE INVENTION

This invention relates to DC-DC flyback converters and more particularly to a DC-DC flyback converter having a controlled synchronous rectifier in a secondary circuit and the means of controlling the synchronous rectifier.

BACKGROUND OF THE INVENTION

Figure 1:
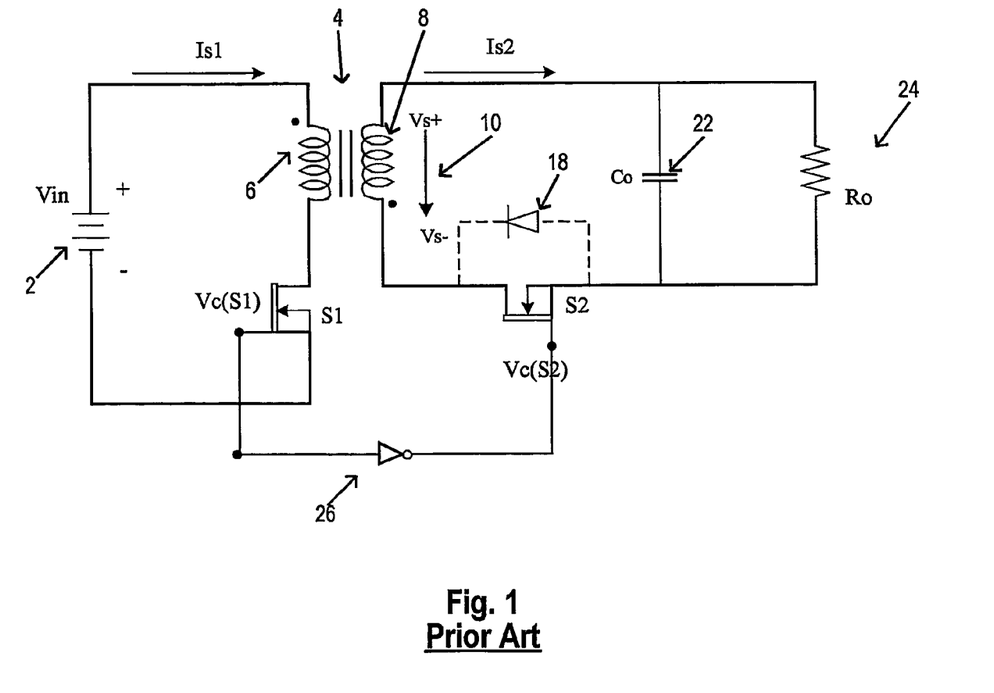
FIG. 1 is a schematic of a prior art flyback converter with a synchronous rectifier in the output section.

Of available DC-DC converters used for power conversion purposes, the flyback converter is the most simple. Its minimum configuration consists of only a switch, a transformer, a diode and two capacitors (one at the input port and the second one at the output port). In low-output-voltage converters, the conduction loss of the diode rectifier due to its forward voltage drop becomes the dominant power loss. In certain conditions this loss can reach 50% of the total power loss. The simple approach conceived to reduce the above-mentioned power loss was to replace the rectifying diode with a synchronous rectifier, i.e. with a low-ON-resistance MOSFET. To perform the normal operation of the flyback converter the control of the MOSFET used as the synchronous rectifier is easily obtained by inverting the primary main switch control signal. FIG. 1 shows such an approach. There an input voltage source 2 supplies a series-connected primary winding 6 of a transformer 4 and a primary switch S1. A control signal Vc(S1) for the switch S1 is constant frequency control signal having a variable ON duty-cycle to assure a stable output voltage. To the output circuit, a secondary winding 8 of the transformer 4 provides a voltage 10 that alternates in polarity. The synchronous rectifier S2 couples an output load circuit comprising a load 24 and a filtering capacitor 22 to the output voltage 10 during the OFF time of S1's switching period. A synchronous rectifier S2 receives a control signal Vc(S2) through an inverter 26. Because of its effect during operation of the circuit, the body diode 18 of the MOSFET that is used as a synchronous rectifier is also shown in FIG. 1.

Figure 1A:
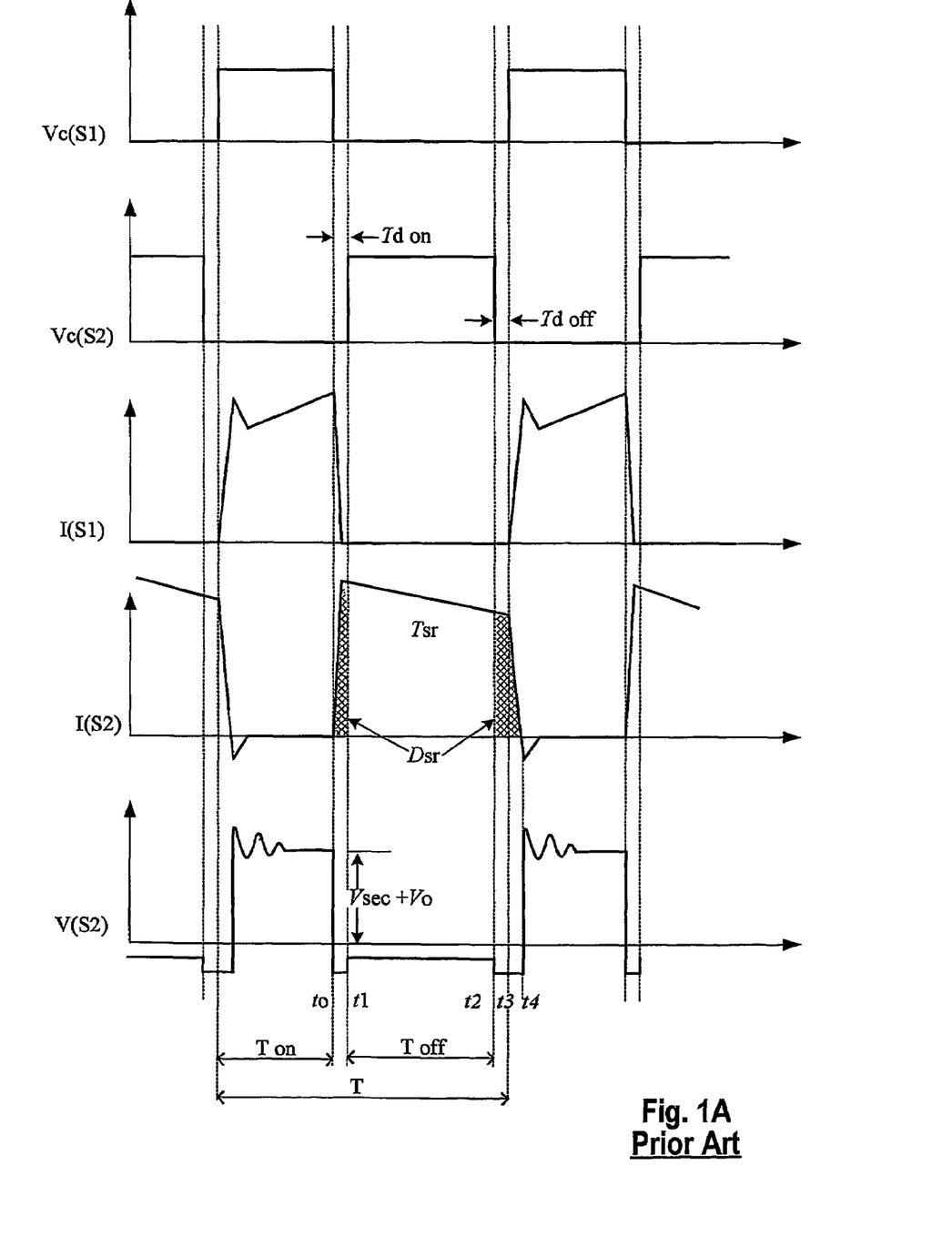
FIG. 1A is a series of plots of the main voltage and current waveforms, versus time, for the continuous-conduction mode of operation or CCM of the prior art converter of FIG. 1.
Figure 1B:
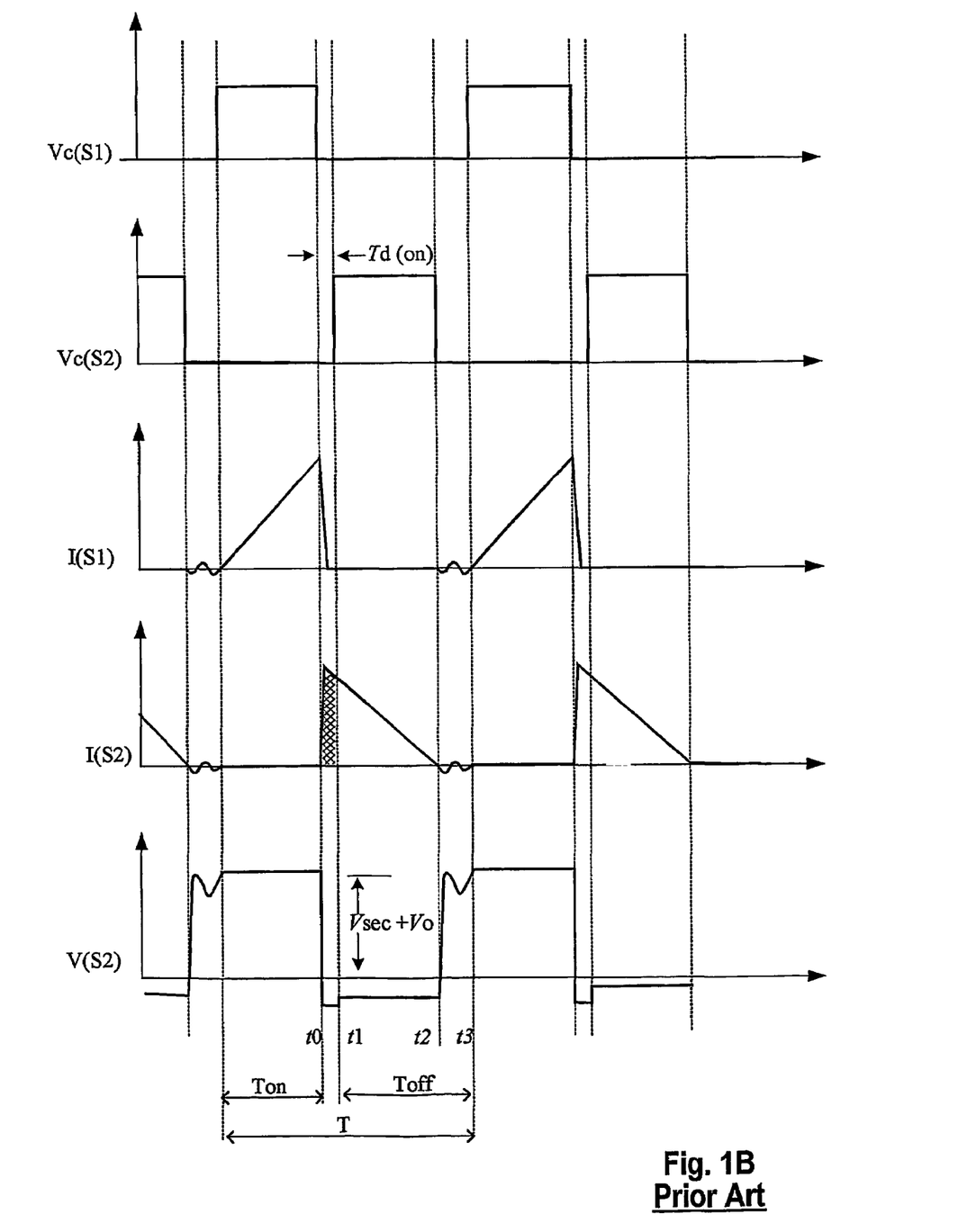
FIG. 1B is a series of plots of the main voltage and current waveforms, versus time, for the discontinuous-conduction mode of operation or DCM of the prior art converter of FIG. 1.
Figure 1C:
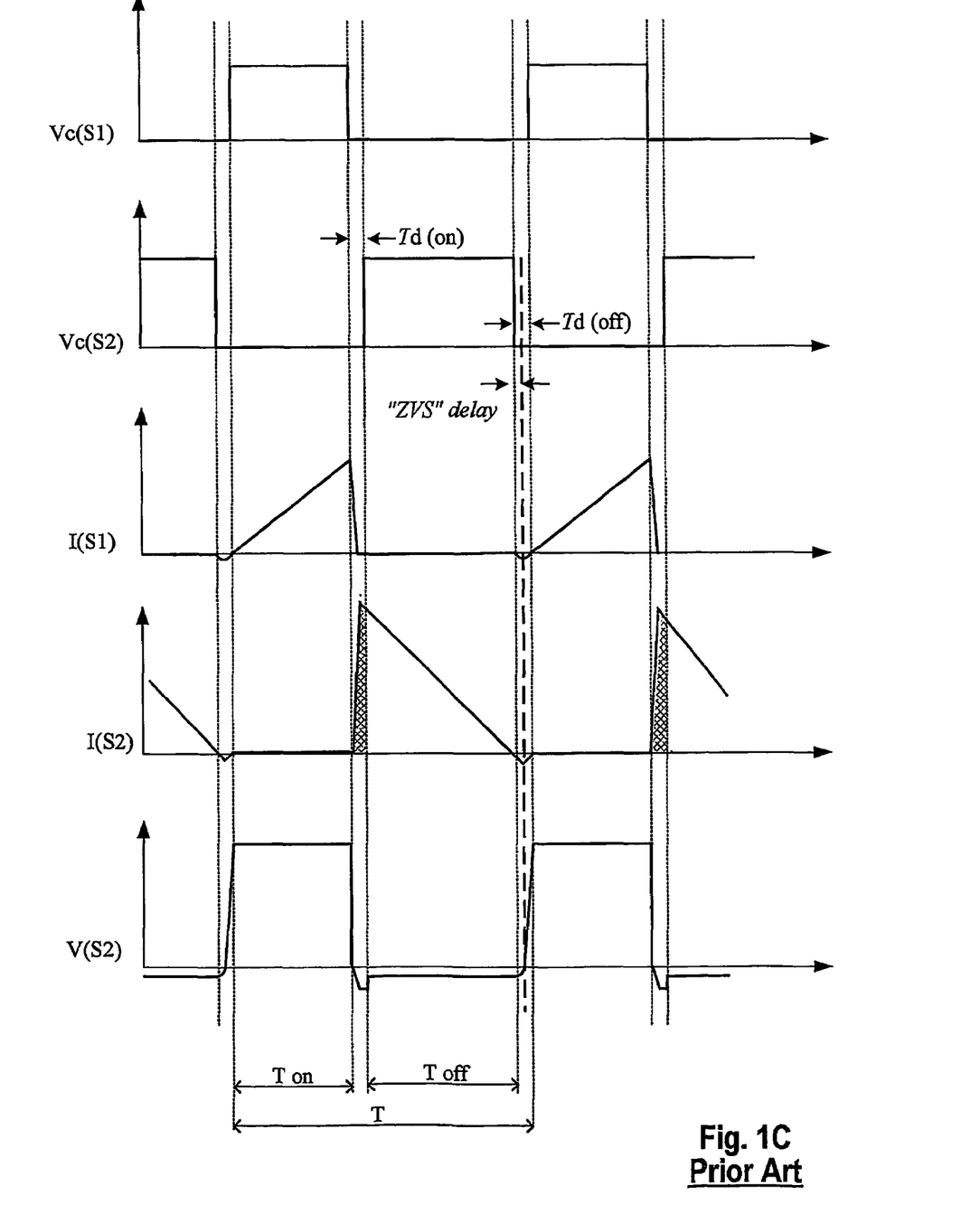
FIG. 1C is a series of plots of the main voltage and current waveforms, versus time, for the critical-conduction mode of operation, the limit case between CCM and DCM, of the prior art converter of FIG. 1.

FIG. 1A displays the voltages and currents versus time waveforms for the flyback circuit parameters, i.e., Vc(S1), the control signal for the switch S1; Vc(S2), the control signal for switch S2 or synchronous rectifier; I(S1), the current through the switch S1; I(S2), the current through the switch S2 and V(S2), the voltage across the switch S2, for continuous-conduction mode (CCM). FIG. 1B displays the voltages and currents versus time waveforms for the discontinuous-conduction mode of operation (DCM). FIG. 1C depicts the same waveforms for the critical conduction mode of operation, the limit case between continuous mode and discontinuous mode of operation.

The main drawback of the above presented approach is the cross-conduction (concurrent conduction) of the primary switch S1 and secondary synchronous rectifier S2 for the time intervals $t_0$-$t_1$, $t_2$-$t_3$ (see FIG. 1A), for CCM operation. As a result, during these time intervals when the body-diode 18, an intrinsic part of the synchronous rectifier S2, is ON, supplementary power losses appear and have to be taken into account. Another drawback is related to power loss introduced by the reverse recovery, during $t_3$-$t_4$, of the body-diode 18 during turn-off of the primary switch S1, which adds to the general power balance or total power use of the circuit.

For DCM operation, See FIG. 1B, the power loss due to reverse recovery process of the body-diode 18 is eliminated because the current of the synchronous rectifier S2 becomes zero before the primary switch S1 is turned "on," but the cross-conduction process during turn-off of switch S1 still exists. There are two drawbacks related with this mode of operation: higher conduction loss during Td (ON), see FIG. 1C, due to cross-conduction of I(S1) and I(S2) and the fact that the circuit efficiency fluctuates with Vin of the input voltage source 2.

The critical conduction mode of operation offers in certain conditions a zero voltage switching or ZVS feature which can be used if a proper design of the circuit is made. In this case the recover loss is eliminated also but the higher conduction loss associated with cross-conduction of I(S1) and I(S2), during Td(ON) delay, is still important.

There is a need therefore for a DC-DC flyback converter having a synchronous rectifier in its secondary circuit that is controlled such that cross-conduction losses are eliminated or substantially eliminated and reverse recovery losses are eliminated or substantially eliminated.

SUMMARY OF THE INVENTION

In order to address the drawbacks of the prior art, the present invention provides an improved driving circuit that reduces power loss due to cross-conduction process.

In accordance with a preferred embodiment of the present invention, a driving technique is provided which improves the efficiency of a flyback DC-DC converter using a synchronous rectifier in the output section or secondary circuit by processing in a certain sequence information related to the primary switch control, the voltage across the secondary winding of the power transformer and the voltage across the synchronous rectifier to obtain a final control signal for the synchronous rectifier.

In one embodiment of the present invention, the control circuit for a synchronous rectifier in the secondary circuit comprises a logic circuit that uses the control signal that is used to control the main switch or primary switch in the primary circuit and the voltage derived from a secondary winding of a main transformer coupling the primary and secondary circuits. The logic circuit also uses the voltage across the synchronous rectifier to form a third input to the logic circuit. The signals developed turn ON and turn OFF the synchronous rectifier. More specifically, the logic circuit of the embodiment of the invention just described includes an AND gate to which a voltage derived (inverted) from the main switch control signal is applied along with outputs from first and second bistable circuits. The first bistable circuit is supplied an input from a first comparator to which the voltage derived from a main transformer secondary winding is applied. The second bistable circuit has an input from a second comparator to which is supplied the voltage across the synchronous rectifier. To the first and second bistable circuits the main switch control voltage is applied as a second input. In this way the main switch control signal turns OFF the synchronous rectifier and the voltage across the secondary winding turns ON the synchronous rectifier. Reference inputs to the comparators typically are set at substantially zero volts. In the preferred embodiment that uses the logic circuit to develop the synchronous rectifier control, typically the first and second bistable circuits, are first and second RS flip-flops. The voltage derived from the first control signal is applied to the "set" or S input of each of the flip-flops. To the "reset" or R inputs are applied the outputs of the first and second comparators, respectively. The first flip-flop has its "set" or Q output applied as an input to the AND gate and the second flip-flop has its "reset" or Q output applied as an input to the AND gate.

The method of controlling induction of the synchronous rectifier in the secondary circuit of a DC-DC flyback converter, then, preferably includes turning on the synchronous rectifier in dependence on establishment of a voltage across a transformer secondary winding of the main transformer that couples the secondary circuit to the primary circuit and turning OFF the synchronous rectifier in dependence on turning ON the main switch in the primary circuit. Turning OFF the synchronous rectifier in dependence or the turning ON of the main switch preferably comprises turning OFF the synchronous rectifier when the main switch is turned "on." As previously described the method can include providing a logic circuit connected with the control electrode of the synchronous rectifier for the application of the voltage derived from a voltage across a secondary winding as one input to the logic circuit and applying a voltage derived from a main switch control signal as a further input to the logic circuit. In a preferred embodiment the third input to the logic circuit is a voltage derived from a voltage across the synchronous rectifier.

The method of a specific, exemplary preferred embodiment can be utilization of the logic circuit as described in greater detail above in connection with the use of an AND gate, a pair of bistable circuits, and supplying the main switch control signal to an inverter connected with the AND gate. In this method, the provision of the bistable circuits can be the provision of first and second RS flip-flops as previously described. Also as previously described the method can include the application of the specific inputs to the set and reset inputs of the flip-flops and the specific set and reset outputs applied to the AND gate.

In a further embodiment of the invention the secondary winding from which the control signal for the synchronous rectifier is in part derived can be a control secondary winding wound on a magnetic core that serves as the main transformer core, the magnetic core having a center flux path dividing into two outer flux paths onto which the secondary winding is wound in current canceling relation as to flux that is conducted from the center flux path to the two outer flux paths. A primary control winding on at least one of the two outer flux paths is supplied an input derived from the main switch control voltage.

In a preferred embodiment the main switch control voltage is differentiated and the differentiated signal is applied to the control primary winding input. In this preferred embodiment, the main switch control signal is substantially a square wave.

In one specific exemplary preferred embodiment, the control voltage developed in the control secondary winding of the embodiment of the invention just described is applied to a switching circuit connected in controlling relation to the synchronous rectifier. The switching circuit may be a transistor switching circuit. In the case of a transistor switching circuit, a DC bias voltage can be developed from a secondary winding of the main transformer and applied to the transistor switching circuit for the purpose of applying a DC bias thereto. In each of the preferred exemplary embodiments described, the synchronous rectifier can be a MOSFET switch. Where a transistor switching circuit is connected to control the synchronous rectifier, it can be connected to the gate of the MOSFET switch. One preferred embodiment of a suitable transistor switching circuit is a serially connected PNP and NPN transistor pair connected between the DC bias voltage and ground, the junction of the transistor pair being connected to the gate of the MOSFET switch.

A preferred embodiment of a DC-DC flyback converter in accordance with the invention is a flyback converter having, as previously described, a synchronous rectifier in its output or secondary circuit to which is supplied a control signal derived from a voltage across a control secondary winding that is wound upon two outer flux paths of a magnetic core serving as the magnetic core of the main transformer and arranged such that flux conducted from a center flux path into the outer flux paths develops substantially no current in the control secondary winding. A control primary winding is wound onto at least one of the two outer flux paths and preferably, in one preferred embodiment, onto each of the two outer flux paths in current canceling relation with respect to the flux conducted to the outer flux path from the center flux path. An input to a circuit supplying the control primary winding with an input taken from the primary or main switch control signal is, preferably, a differentiation circuit connected between the control of the main switch and the control primary winding. In this flyback converter, the control signal applied to the synchronous rectifier can be supplied by the switching circuit described above. Again, the switching circuit can be a transistor switching circuit and can have a bias potential applied thereto taken from a DC bias circuit connected with a secondary winding and including at least one rectifying diode. The turning ON and OFF of the transistors that make up the transistor switching circuit is, of course, taken from the control secondary winding.

In the preferred exemplary embodiments described herein, power losses due to cross conduction between the main switch and the synchronous rectifier can be eliminated or nearly entirely eliminated and reverse recovery losses can likewise be eliminated or nearly entirely eliminated.

Both of the above-described embodiments of the present can be implemented by using either a separate transformer or one integrated with the main transformer. The transformer can be discrete component of its own or can be imbedded in a PCB carrying the converter circuitry. The driving transformer in both embodiments can be embedded into the main transformer of the converter.

The foregoing and other objects, features and advantages of the present invention will be more readily understood upon consideration of the following detailed description of the invention together with the following drawings.

DETAILED DESCRIPTION

Figure 2:
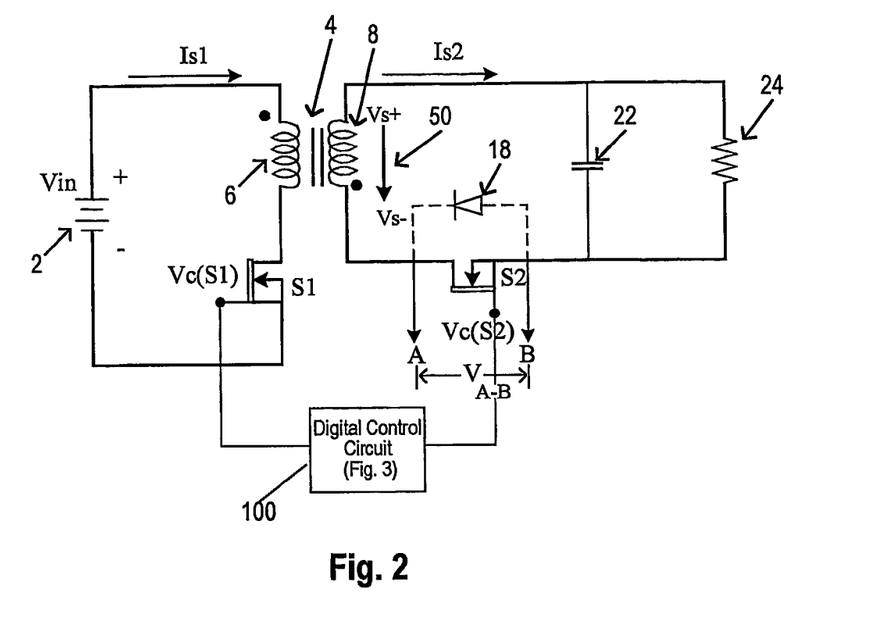
FIG. 2 illustrates the basic schematic of the flyback converter with synchronous rectifier in the output section according to this invention.

The approach used to control the synchronous rectifier of a DC-DC flyback converter according to this invention is first described in relation to the improved basic schematic of the flyback converter shown in FIG. 2. In the flyback converters of FIGS. 1 and 2, like elements bear like reference numerals. The voltage source 2 supplies the input circuit formed by the primary winding 6 of the power transformer 4 connected in series with the switching MOSFET S1. The switching transistor S1 is controlled by a signal Vc(S1). The output circuit of the flyback converter contains the secondary winding 8 of the power transformer 4 connected in series with the synchronous rectifier S2 and the output load 24. The output voltage obtained on the load is filtered by the capacitor 22. The body diode 18 of the synchronous rectifier is also represented as it plays a role in the operation of the circuit. According to one preferred embodiment of this invention, besides the main switch control signal Vc(S1), which controls the main input switching transistor S2 in FIG. 1, two supplementary signals are used to process the final controlling signal Vc(S2) for the output synchronous rectifier S2. These are the voltage 50, Vs(+)-Vs(−), across the secondary winding and the voltage Va-b across the synchronous rectifier S2. This is described with reference to FIG. 3.

Figure 3:
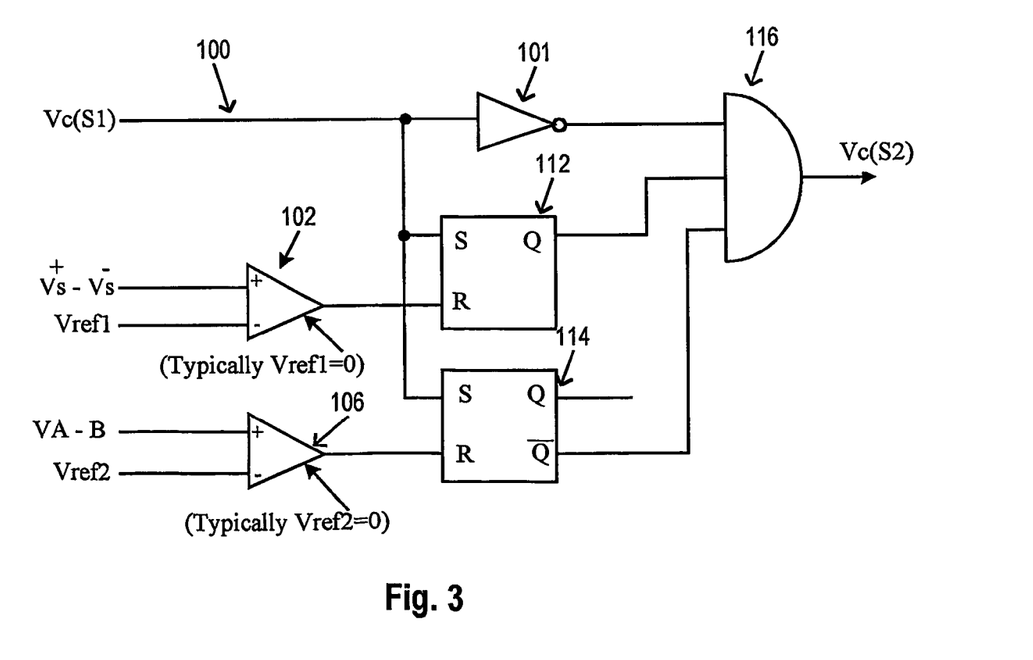
FIG. 3 is a schematic of a synchronous rectifier like that of the converter of FIG. 2 including the control according to this invention.

In FIG. 3 a control section 100 is used to process digitally the signal Vc(s2). The main switch control signal Vc(S1) is first coupled through an inverter 101 to the multiple input AND gate 116. Also the signal Vc(S1) is coupled to the "set" (S) inputs of two bistable circuits 112 and 114. These may be RS flip-flops as shown. The voltage 50 across the secondary winding 8, Vs(+)-Vs(−), is coupled to the non-inverting input (+) of a comparator circuit 102. On the inverting input (−) is coupled a reference signal Vref1, which typically is equal to zero, but could have a non-zero value also. The output signal of the comparator circuit 106 is connected to the "reset" (R) input of the bistable circuit 114. The output "set" (Q) state of the bistable circuit 112 and the output "reset" $\overline{(Q)}$ state of the bistable 114 are each connected to one of the multiple inputs of the AND gate 116. The output of the AND gate 116 provides the control signal Vc(S2) for the synchronous rectifier S2. The main features this circuit assures are: the turn ON of the synchronous rectifier S2 is provided by the voltage 50 on the secondary winding, Vs(+)-Vs(−), and turn OFF is by the information coming from the primary side, Vc(S1). Cross-conduction of the main switch S2 and the synchronous rectifier S2 is avoided.

Figure 4A:
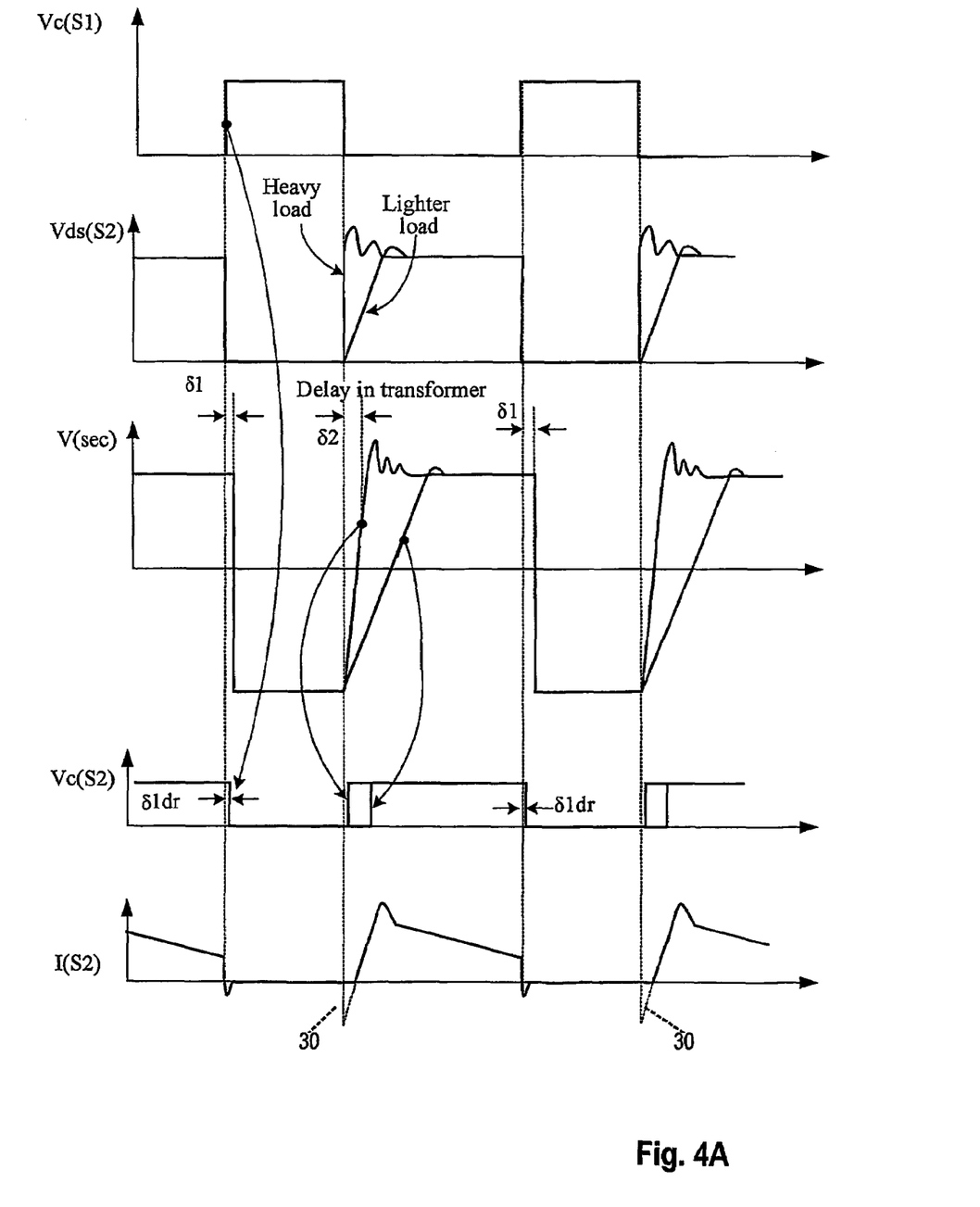
FIG. 4A is a series of plots of the main voltage and current waveforms, versus time, for the continuous-conduction mode of operation or CCM of the converter of FIG. 2 according to this invention.

FIG. 4A depicts the main voltage and current waveforms versus time for the converter of FIG. 2 operating in continuous-conduction mode and with the improved control of the digital logic circuit depicted in FIG. 3. FIG. 4A shows the drain-source voltage Vds(S1) on the main primary switch S1. Also shown is the voltage on the secondary winding Vsec (Vs(+)-Vs(−)), which takes into account the delay produced in the transformer by the leakage inductance and the level of the current through it. FIG. 4A shows, as well, the effect on the control signal Vc(S2) produced by a heavy or a light load. I(S2), the current through the synchronous rectifier is also shown in FIG. 4A. Shown in broken lines is the reverse current 30 eliminated by the "adjustable" turn ON by Vc(S2) of the synchronous rectifier to eliminate reverse recovery losses.

Figure 4B:
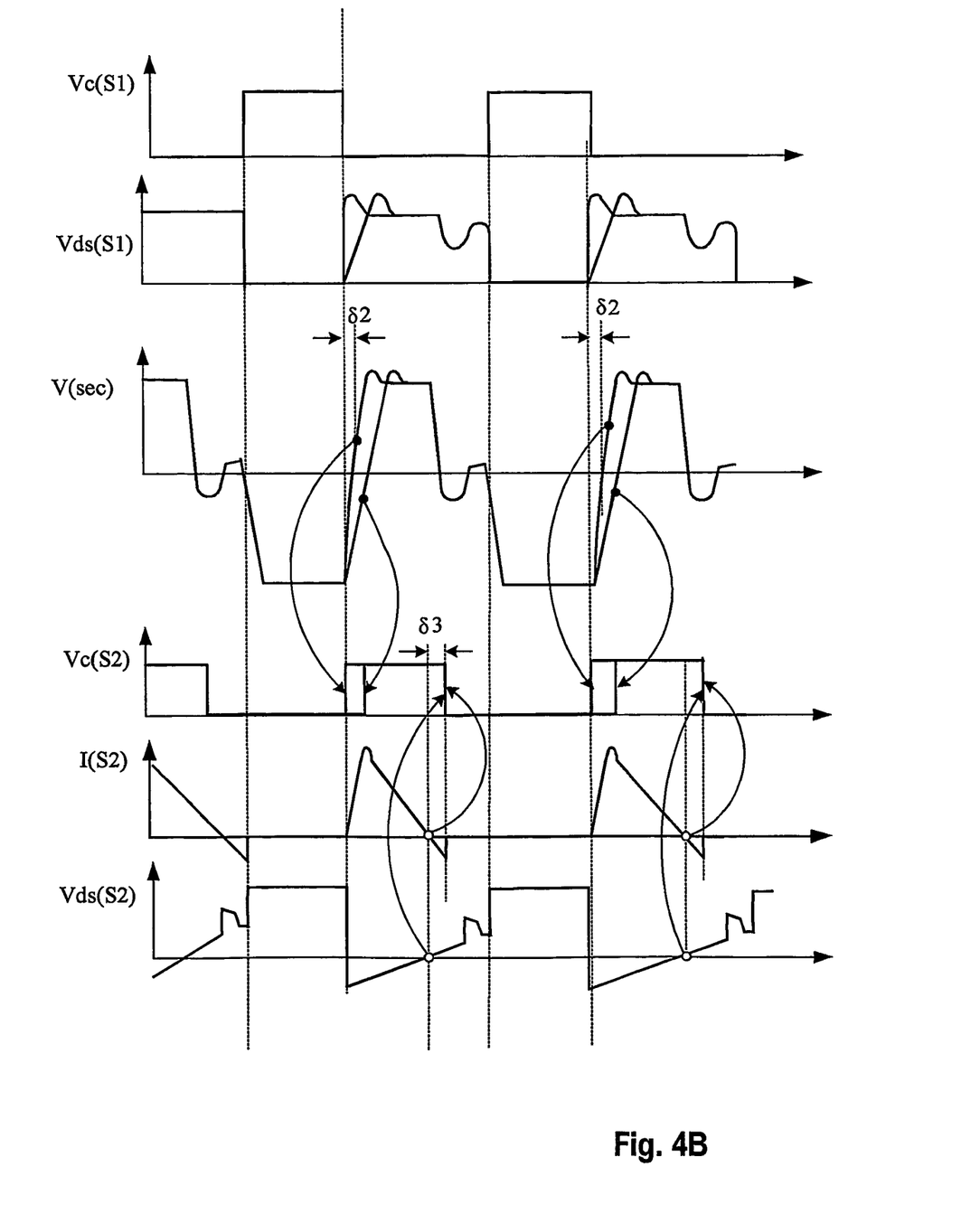
FIG. 4B is a series of plots of the main voltage and current waveforms, versus time, for the discontinuous-conduction mode of operation or DCM of the converter of FIG. 2 according to this invention.

FIG. 4B depicts the main voltage and current waveforms versus time for the converter of FIG. 2 operating in discontinuous-conduction mode, and with the improved control of the digital logic circuit depicted in FIG. 3. FIG. 4B shows the drain-source voltage Vds(S1) on the main primary switch S1. Also shown is the voltage on the secondary winding, Vsec (Vs(+)-Vs(−)), which again takes into account the delay produced in the transformer by the leakage inductance and the level of the current through it. FIG. 4B shows, as well, the voltage Vds(S2) across the synchronous rectifier S2 and the effect on the control signal Vc(S2) produced by a reduced load.

Figure 5:
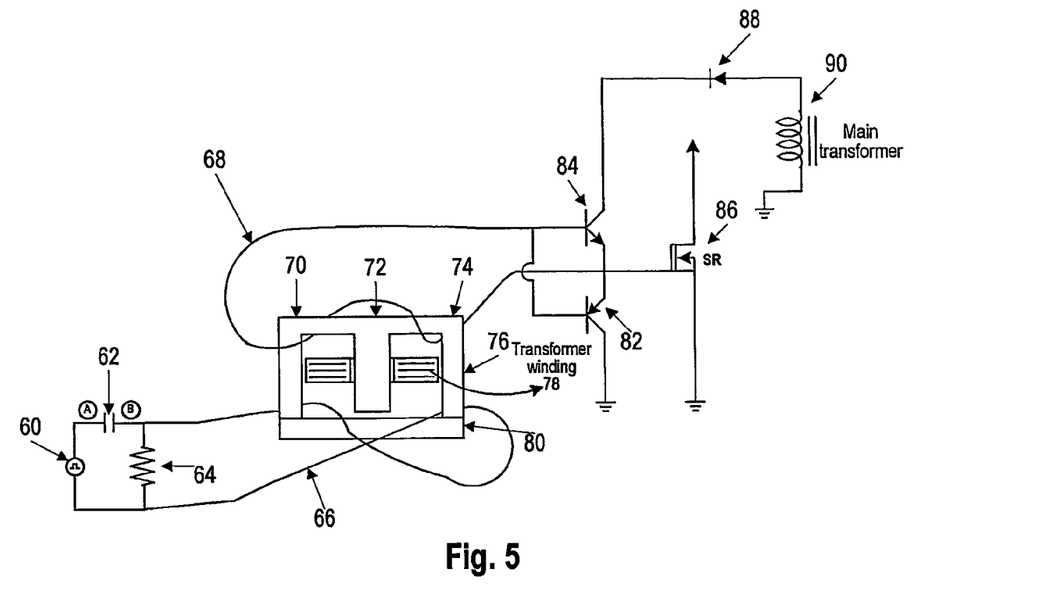
FIG. 5 is a series of plots of the driving technique of the synchronous rectifier of the converter of FIG. 2 according to this invention.
Figure 5A:
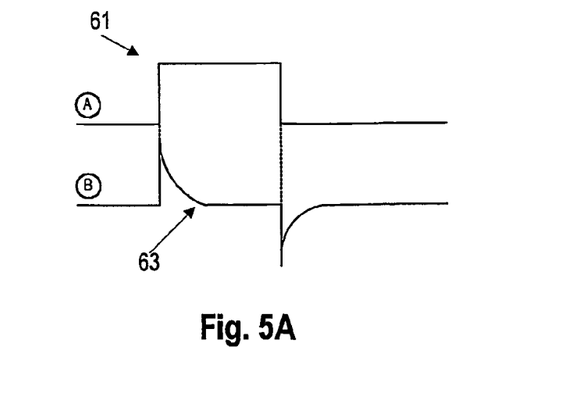

Another embodiment of this invention is exemplified by the driving technique used to control the synchronous rectifier S2 as depicted in FIG. 5. The driving technique can make use of a transformer separate from the main transformer, or transformer windings integrated with the main transformer as illustrated in FIG. 1. Either way, the transformer can be a discrete transformer or a planar transformer imbedded in a PCB. An input signal source 60 is applied through a derivative or differentiation (dv/dt) RC circuit 62, 64 to a control primary winding 66 wound on the outer flux paths 70, 74 of an E+I magnetic core assembly 76, 80. The input signal 60 is ordinarily the control signal for the main switch S1 connected in the input, primary circuit (as shown in FIG. 1). FIG. 5A plots, at 61, the voltage of source 60 at point A in FIG. 5, and its derivative, at 63, provided at point B in FIG. 5 vs. time. The main windings 78 of the power transformer are wound on the center leg 72. Control secondary winding 68 is also wound on the outer flux paths 70, 74. The control secondary winding 68 is wound on the outer flux paths such that flux passing into the outer flux paths from the center flux path of the leg 72 results in substantially no current in the winding 68. In the embodiment of FIG. 5, the control primary winding 66 is similarly wound. Flux produced in the outer flux paths 70, 74 cancel in the center leg 72. In this way the windings 66, 68 of the driving transformer produce a magnetic field that doesn't interfere with the main one produced by the power transformer as long as the driving field is not too high, and the control secondary winding current is the result of substantially only the control primary winding excitation. The output signal produced by the secondary winding 68 is applied to a totem-pole structure made by serially connected NPN transistor 84 and PNP transistor 82, which structure delivers the control signal to the synchronous rectifier 86. The totem-pole structure is supplied with a biasing DC voltage produced by an auxiliary winding 90. This is preferably also wound on the main transformer and is rectified with a rectifying diode 88. The operating characteristics of this embodiment are essentially the same as those of the converter operated under control of the circuit of FIG. 3, as plotted in FIGS. 4A and 4B.

A main advantage of this embodiment as shown is the simplicity of the driving circuit. At the same time the integrated option offers the lower cost which can be obtained because the synchronous rectifier 66 and 68 driving windings are designed and made together with main windings 78 of the power transformer. Note that the "outer flux paths" on which the windings 66 and 68 are wound include not just the outer legs 70 and 74 but the entire magnetic structure forming the two paths out of and then returning to the center leg. In other words either or both windings 66 and 68 can be wound on the upper or lower paths adjoining the center leg as shown in FIG. 5 as well as on the two outermost legs of the magnetic core 76, 80.

The foregoing descriptions of preferred embodiments are exemplary and not intended to limit the invention claimed. Obvious modifications that do not depart from the spirit and scope of the invention as claimed will be apparent to those skilled in the art. For example, although the logic circuit of FIG. 3 uses specific bistable circuits and gate, other logic element may be arranged to accomplish the same or a similar output from the inputs applied. And in the embodiment of FIG. 5 "E" and "I" magnetic core elements are employed, but a toroid bridged by a central leg could provide the outer flux paths and the center leg for example. Switching circuits other than the series connected transistors 82 and 84 may be effectively employed as well.

I claim:

1. A method of controlling conduction of a synchronous rectifier in a secondary circuit of a DC-DC flyback converter comprising:
    (a) turning ON the synchronous rectifier in dependence on the establishment of a voltage across a secondary winding of a main transformer inductively coupling the secondary circuit to a primary circuit of the flyback converter, and
    (b) turning OFF the synchronous rectifier in dependence on turning ON of a main switch in the primary circuit in current controlling relation to a primary winding of the main transformer.

2. The method according to claim 1, wherein step (b) comprises turning OFF the synchronous rectifier in dependence on a control signal turning ON the main switch.

3. The method according to claim 1, wherein the secondary winding is a control secondary winding, steps (a) comprising providing in the main transformer a magnetic core having a center flux path and two outer flux paths, winding the control secondary winding on the two outer flux paths in current canceling relation as to flux conducted to the two outer flux paths from the center flux path, winding a control primary winding on at least one of the two outer flux paths, winding on the center flux path at least a main primary winding in energy communicating relation to a main secondary winding.

4. The method according to claim 3, further comprising winding the main secondary winding on the center flux path.

5. The method according to claim 3, wherein winding a control primary winding comprises winding the control primary winding on the two outer flux paths in flux canceling relation with respect to the center flux path.

6. The method according to claim 3, further comprising applying a control voltage developed in the control secondary winding to control the switching ON and OFF of the synchronous rectifier.

7. The method according to claim 3, further comprising applying to the control primary winding a differential signal developed by differentiation of a main switch control signal.

8. A DC-DC flyback converter having a main transformer, a DC input connection in a primary circuit connected with a primary winding of the main transformer, a controllable primary switch in series with the primary winding of the main transformer, said controllable primary switch having a primary control signal input connection for applying a first control signal in controlling relation to the controllable primary switch, a load connection in a secondary circuit connected with a secondary winding of the main transformer, a synchronous rectifier connected in series with the secondary winding and having a control connection for applying a second control signal to the synchronous rectifier in controlling relation to the synchronous rectifier, a control circuit coupled between the primary control signal input connection and the control connection for applying the second control signal to the synchronous rectifier control connection, the improvement comprising:
    the control circuit comprising a control primary winding and a control secondary winding wound on the main transformer, the control primary being connected in a circuit having an input from the primary control signal input connection, the control secondary winding being connected in controlling relation to the control connection of the synchronous rectifier, the main transformer having a magnetic core with a center flux path on which is wound a main primary winding, and the magnetic core having two outer flux paths on both of which is wound the control secondary winding, the control primary winding being wound on at least one of the outer flux paths, the control secondary winding being wound on the two outer flux paths in current canceling relation with respect to flux conducted to the two outer flux paths from the center flux path, whereby a control signal generated in the control secondary winding is substantially unaffected by flux developed in the main transformer by currents in the main primary winding.

9. The DC-DC flyback converter of claim 8, wherein the control primary winding is wound on both of the two outer flux paths in flux canceling relation with respect to the center flux path.

10. A DC-DC flyback converter having a main transformer, a primary circuit including a controllable switch connected in current controlling relation to a primary winding and having a control connection for opening and closing the switch under the control of a first control signal, a secondary circuit for supplying an output to a load, and a synchronous rectifier having a control connection for opening and closing the synchronous rectifier, the improvement comprising:
    a control circuit coupled between the control connections of the controllable switch and the synchronous rectifier comprising
    (a) means for turning ON the synchronous rectifier in dependence on a voltage developed across a secondary winding on the main transformer, and
    (b) means for turning OFF the synchronous rectifier in dependence on the first control signal turning ON the controllable switch.

* * * * *